United States Patent [19]

Rittner et al.

[11] Patent Number: 5,281,479
[45] Date of Patent: Jan. 25, 1994

[54] CORROSION AND HEAT-RESISTANT ORDERED PACKING FOR MASS TRANSFER AND HEAT EXCHANGE PROCESSES

[75] Inventors: Siegbert Rittner, Mörfelden-Walldorf; Jürgen Spiske, Seeheim; Dieter Kompalik, Augsburg; Udo Gruber, Neusäss, all of Fed. Rep. of Germany

[73] Assignee: Sigri Great Lakes Carbon GmbH, Wiesbaden, Fed. Rep. of Germany

[21] Appl. No.: 837,245

[22] Filed: Feb. 14, 1992

[30] Foreign Application Priority Data

Feb. 14, 1991 [DE] Fed. Rep. of Germany ....... 4104447

[51] Int. Cl.$^5$ .............................................. B32B 9/00
[52] U.S. Cl. .................................. 428/408; 428/272; 428/290; 428/131
[58] Field of Search ............... 428/272, 290, 260, 245, 428/408

[56] References Cited

U.S. PATENT DOCUMENTS 4,659,624 4/1987 Yeager et al. ....................... 428/408
4,917,923 4/1990 Yoshida et al. ..................... 428/34.1

FOREIGN PATENT DOCUMENTS 2109006 5/1983 United Kingdom .

OTHER PUBLICATIONS

Technische Rundschau Sulzer, Article by W. Meier, Feb. 1979, pp. 49–61.
Chemische Technologie, vol. 1, Anorganische Technologie I, Carl Hanser Verlage, Munich 1969, pp. 504 and 505.

Primary Examiner—George F. Lesmes
Assistant Examiner—Chris Raimund
Attorney, Agent, or Firm—Herbert L. Lerner; Laurence A. Greenberg

[57] ABSTRACT

An ordered packing for mass transfer and heat exchange processes includes pre-formed individual parts. The packing is formed of carbon fiber-reinforced carbon with carbon fibers or carbon fiber yarns, which are linked one with the other by way of textile bindings, as a filler and of a matrix carbon, preferably based on synthetic resins.

18 Claims, 5 Drawing Sheets

Fig. 1

Fig. 2: NUMBER OF THEORETICAL STAGES AND PRESSURE DROP AT 1013 mbar

Fig. 3: NUMBER OF THEORETICAL STAGES AND PRESSURE DROP AT 400 mbar

Fig. 4: NUMBER OF THEORETICAL STAGES AND PRESSURE DROP AT 100 mbar

CORROSION AND HEAT-RESISTANT ORDERED PACKING FOR MASS TRANSFER AND HEAT EXCHANGE PROCESSES

The invention relates to an ordered packing composed of pre-formed individual parts for use in columns and reactors for mass transfer and energy exchange processes.

Mass transfer and energy exchange processes take place between substances in identical or different states of aggregation and are used for the purposes of enrichment or depletion, chemical reactions, purification, cooling or heating of substances. In particular, processes such as distillation, rectification, extraction, cooling of gases by evaporation of liquids or precipitation of substances from gases can be mentioned in this case as well. Apparatus in which these processes are generally carried out, are equipped with installations for guiding and evening out fluid currents as well as for attaining layers of the substances taking part in the transfer or exchange processes which are as thin as possible. The installations serve the purpose of guaranteeing a constant close contact of the components taking part in the process. They can be constructed in a great variety of ways. In columns, for example, one of skill in the art is familiar with different kinds of trays such as bubble-cap, tunnel-cap, sieve, grid, jet, valve or cascade trays. Likewise, filler bodies are used which constitute the contents of a distillation apparatus or column, in a random configuration that is brought about, for example, by pouring, or even in an ordered configuration.

A third group of installations are ordered packings, as discussed in pages 49-61 of an article by W. Meier in the February 1979 issue of the publication entitled Technische Rundschau Sulzer. In that case it is a question of plates produced from mostly metallic or ceramic materials or plastics materials with a plurality of through-openings which are often corrugated or zigzag-shaped and are joined together and positioned close together and adjacent each other, to give generally cylindrical column installations, which are installed in a certain manner one upon the other in a column. Such packings have become known, for example, under the trademarks "BX-PACKUNG", "MELLAPAK" or "KERAPAK" of the firm Sulzer. Such a packing type is wide-spread due to its low pressure loss, low liquid retention, high separator stage number an low bad distribution in process technology and is used with most success in particular for difficult separating tasks.

The effectiveness of the ordered packings is due to their complicated structure which is characterized by a plurality of differently disposed channels and through-openings. Materials, such as metals or plastic materials, which can be deformed and processed particularly easily, are therefore suitable for economical production. Accordingly, above all, for reasons of corrosion, their range of application has remained limited, despite their great advantages. Metal packings, even with use of expensive special alloys, are often not resistant or only resistant to a limited extent to aggressive substances of an acidic, basic or salt-like nature. Intensive development work therefore has resulted in ordered packings made of plastic material and of ceramics (for example "KERAPAK", 1977). However, packings made of such materials can only be used to a limited extent and cannot fully close the gaps in terms of material techniques. Packings of plastic materials lack temperature stability and resistance to chemicals, in particular to organic agents. They are deformed, swell or are dissolved. The heat-resistant ceramic packings are not resistant to alkalis, aqueous mineral acids and agents containing fluorine and have poor thermal conductivity.

Corrosion in ordered packings results in a drop in the level of efficiency and contaminates the product. Deformations can lead to severe disruptances in functioning and along with that, in processes. A further disadvantage is the comparatively high weight of the packings essentially produced from metals, which must be considered when constructing and installing the apparatus and which entails higher expense.

It is accordingly an object of the invention to provide a corrosion and heat-resistant ordered packing for mass transfer and heat exchange processes, which overcomes the hereinafore-mentioned disadvantages of the heretofore-known devices of this general type and which is thus both heat-resistant and largely corrosion-resistant, but is light, of high strength, mechanically stable and has good thermal conductivity and can be produced with little technical expenditure in any desired form.

With the foregoing and other objects in view there is provided, in accordance with the invention, an ordered packing for columns or reactors for mass transfer and heat exchange processes, comprising pre-formed individual parts built up from a carbon fiber-reinforced carbon being formed of a filler selected from the group consisting of carbon fibers and carbon fiber yarns being linked with each other by textile bindings, and a matrix carbon.

The term "carbon" in the claims and in the specification is likewise applicable to non-graphitized carbon and graphitized carbon, irrespective of whether one is speaking of the carbon fiber-reinforced carbon as such, which is also referred to below as CFC, or of the carbon matrix.

The use of carbon as a material in apparatus for trays or filler bodies of various kinds has been known for a long time due to its excellent corrosion-resistance, since carbon is only attacked by the strongest oxidants, and due to its heat-resistance, as discussed by K. Winnacker and L. Küchler in the publication entitled Chemische Technologie, Volume 1, Anorganische Technologie I, pages 504 and 505, published by Carl Hanser Verlag, Munich in 1969.

Polygranular carbon, which is used for such known applications, is produced from filler grain and a binding agent containing carbon by means of a shaping method such as extrusion or vibratory compaction, subsequent carbonization with air exclusion and, if applicable, graphitization. Blanks that are thus obtained in the form of blocks with corners or cylindrical blocks, bars or tubes are brought into their final form by methods of machining down, such as sawing, turning, boring, milling or grinding, and are also provided with preset openings or through-passages. That method is economical for simply constructed parts. Parts of complicated form, such as folded foils or sheet-shaped structures with complicated recesses, elevations or grooves, for example, which if applicable, are further provided with a plurality of holes or through-openings, as used in the set-up of ordered packings, can either not be produced at all in this manner or can only be produced with unjustifiably high expenditure.

That is also the reason why heretofore carbon was not used for the production of ordered packings which have been known for more than 20 years, although the world of those skilled in the art must have known that a large number of material problems could have been solved by the use of carbon. The use of a certain CFC type and certain production methods first made it possible to make available such ordered packings being formed entirely of carbon in a technically advanced and inventive manner.

A plate-shaped CFC insert for electrochemical spray towers produced by compacting cellulose fibers with the use of a binding agent and subsequent coking is described in Published U.K. Application GB 2 109 006 A. The plates which are thereby obtained and which are to be as planar as possible, have a considerable thickness of 3 to 10 mm and with that a high weight. Openings, through-passages or slots must be introduced by special shaping methods including mechanical processing. The production of plates which are formed in a complicated manner, are corrugated or zigzag-shaped with a maximum thickness of just 0.4 mm and, without mechanical processing, have a dense pattern of through-openings, as if it has a weave, is not described or suggested. It is also not possible to infer from that publication that fibers can be used for the production of the CFC plates in textile binding like a weave of yarns which can be draped well and that the plates can be used for the production of ordered packings.

It is essential for the present invention that the CFC parts, of which the ordered packings are composed, on one hand, contain carbon fibers or carbon fiber yarns which are linked with each other in the form of textile fabrics, folded structures, knits, machine-knits or other known textile connection forms and, on the other hand, are filled or at least permeated by matrix carbon giving stability of form and additional strength.

In accordance with another feature of the invention, the textile linkage of the yarns or fibers can be two-dimensional or three-dimensional, in which case, for most applications, the less expensive two-dimensionally linked form still gives sufficient stability of form and strength.

In accordance with a further feature of the invention, another form of installable part, which is stable mechanically and in terms of form, is formed of two or more yarn layers which are linked in a two-dimensional manner with respect to the textile, are laid one upon the other and are permeated or filled by matrix carbon and are bound thereby.

In accordance with an added feature of the invention, in the simplest case, the parts, of which the ordered packings are composed, are formed of planar or bowed plates with a thickness of no more than 0.4 mm, which plates, due to the textile skeletal structure, have a slight profiling and a plurality of through-openings in accordance with the number and configuration of the holes contained by the mesh of the weave. More advantageous embodiments have embossed profiles which allow areas of the plates which are put together to form an ordered packing to be held at a distance from each other in such a way that channels are obtained. The channels and profiles together with the through-passages give rise to an intensive mass transfer between the fluid phases. Plates which are embossed in a zigzag or corrugated form have proved particularly successful in this case.

In accordance with an additional feature of the invention, the filler of the CFC parts is formed either of continuous carbon filaments, of carbon yarns which were produced from continuous filaments, or of yarns which were produced from staple fibers. Due to their greater flexibility and their higher porosity, the yarns produced from staple fibers are generally preferred. Such staple fiber yarns can be produced advantageously by tearing suitable plastics or pitch fibers, which are made in such a way as to be infusible, to give a staple length of 2 to 20 cm, preferably of 5 to 15 cm, and processing the resultant staple fibers to form a yarn. However, it is also possible to process staple fibers produced by cutting to form yarns and to use them to produce CFC parts according to the invention.

The continuous filaments and the yarns can be processed further to give a plurality of textile structures suitable as a precursor for the plates according to the invention. However, a characteristic of these textile structures is to have good drapeability.

In accordance with yet another feature of the invention, in the manufacture of the CFC parts, a textile fabric with twill fabric binding is used. This has proved to be particularly advantageous, since it is particularly flexible and can be displaced in itself. As a result of this property, damage to the filler textile fabric is avoided during the shaping of the areal CFC precursor body.

In accordance with yet a further feature of the invention, pores or through-openings located in the surfaces of the parts made of C-fiber-reinforced carbon, can have a clear width of 10 to 10,000 $\mu$m according to the purpose of application or size of the packing. During the operation of the ordered packings these pores or through-openings delay the downward flow of the liquid on the plates or lamellae so that more time is available for the transfer or exchange processes. Such structures moreover have a greater surface and as a result achieve better distribution of the substances in a thin layer and in turn accordingly promote the transfer or exchange processes. The pores and through-openings develop due to incomplete filling with matrix resin of the cavities which exist between the lattice work of the threads in the textile structures and the fine cavities in the yarns and between the filaments. In addition, pores are formed during the carbonization of the matrix resin. It is advantageous that the openings and pores also result in a saving of weight of the installed parts. The choice of the size and shape of the through-openings depends on the size of the installed parts and the requirements in terms of process techniques.

The ordered packings which are described herein are put together in a preset manner from a plurality of plates which are adapted to the respective packing shape, cut to size and profiled, for example with zigzag profiles.

In accordance with a concomitant feature of the invention, the plates are held together by anchoring elements which are produced for this purpose, since the plates themselves do not have any anchoring elements to hold them together. These elements are generally annular sleeves of CFC which surround the plates of the ordered packing at their outer periphery and hold them together. On their upper end, the sleeves are slit vertically. The lamellae which develop as a result of this slitting are bent outwards. In the installed state they rest against the apparatus wall and guide the maldistributed liquid back into the packing. The CFC holding rings are preferably produced from a textile fabric woven from continuous fiber bundles. The greater rigidity achieved thereby is advantageous for this application. However, for the holding support, it is also possible to use textile fabrics that are used for the production of the CFC plates for the inner portion of the packing. Packings of angular shape or very large diameter can also be clamped together by means of clamping anchors of band-shaped CFC, bar anchors and screws or arresting pins of CFC or graphite.

Two or three-dimensionally cross-linked textile structures which were produced from yarns are used for the production of the parts of which the ordered packings are composed. Starting materials for the production of the yarns can be continuous filaments or cut or torn staple fibers with a length of preferably from 5 to 15 cm. Torn staple fibers are preferably used for the production of the yarns for the textile structures from which the plate-like parts are manufactured, while continuous filaments are preferably used for the production of the yarns for the sleeves holding the packings together. However, other yarns can also be used for each of the groups of parts which have been mentioned. A base material for the production of the yarns can be C-fibers based on polyacrylonitrile (PAN), cellulose or pitch. It is also possible to render PAN fibers, cellulose fibers or pitch fibers infusible in the first instance, to produce yarns from these fibers and to process the latter to form the two or three-dimensional textile structures. Preferred forms of the textile structures are textile fabrics with a twill fabric binding.

The areal textile structures are impregnated with a resin which serves as a matrix precursor, with the quantity of the resin generally being preset. As a rule, only so much resin is introduced into the textile structures as is required for the mechanical strength of the subsequent CFC body. This quantity of resin is so low that through-openings and cavities remain in the interspaces of the yarns that are linked together and in the yarns themselves pores remain. The CFC body which later results is therefore lighter and less resin is used. The impregnation can take place according to any known method, for example by dipping, by spraying, according to the autoclave technique or by means of a coating apparatus common in prepreg production, for example a doctor and rollers subsequently connected to the latter. The methods used in prepreg production offer process advantages, since the quantity of impregnating agent being absorbed can easily be regulated by adjusting the pressure which is applied by the rollers. Consideration as resins may be given to all resins which are usual as matrix resins, such as phenolic, epoxy, furan or polyester resins, and also, however, polyimides or bismaleimide resins. The three last-mentioned resin types only come into question for special applications for reasons of cost. Criteria for the selection of the resins, in addition to their processing properties, are the level of the coke yield on carbonization and the structure of the coke being obtained. The matrix coke must give the CFC body sufficient mechanical strength and the open pore volume must be adjusted to the respective intended use. As a rule, as many large pores as possible will be striven for, although there are also cases where an outer surface which is as smooth and dense as possible is striven for. Apart from synthetic resins, finely pulverized petroleum or coal tar pitches in the dry or suspended form can also be used as a matrix precursor.

The impregnated textile structures are then brought into the desired form by processes such as pressing between an upper punch and a lower punch or pressing between rollers, by winding or by means of vacuum bag technology. In this connection, the surfaces of the pressing or shaping tools are provided with profiles which correspond to the forms and profiles striven for. The most common profiles have a round, triangular, quadrangular or trapezoidal shape so that corrugated, zigzag, box or trapezoidal box-shaped profiles result for the pressed plates. When the impregnated textile webs are inserted into the lower pressing mold, it must be ensured that the textile webs also rest against the mold in the recesses in order to avoid distortions or tearing of the webs. The use of separator means or separator foils can facilitate removal of the work pieces from the mold. The shaping preferably takes place at a raised temperature in order to harden the synthetic resin at least in part and to melt onto the fibers the matrix precursors which are applied in a powdery form.

The plates, which are pressed or shaped in another way and which are stabilized by at least partial hardening in their mold, are then carbonized with exclusion of oxygen according to known methods and, if applicable, are graphitized.

The holding rings, which enclose the packings and hold the individual lamellae or plates of the packing together, are produced in a corresponding manner. The shaping of the impregnated textile fabric layers to provide rings then takes place by winding around cores which have the diameter of the corresponding packing. The spreading of the lamellae being produced which result from partial slitting of the upper edge of the textile fabric ring occurs by means of correspondingly shaped conical attachments or spacers provided on the inside. The wound bodies are hardened at least in part by means of temperature action, then removed from the mold and carbonized or graphitized. With a suitable choice of material for the core, it is even possible to carbonize and/or graphitize together with the core without previous removal from the mold.

In order to provide for the assembly of the ordered packings, the plates are cut to size, after shaping, in the at least partly hardened or carbonized state, in order to form smaller plates or lamellae which, when put together, correspond to the dimensions of the desired packing, the smaller plates or lamellae are subsequently joined together to form the packing core and depending on the size of the packing, one or several circular sleeves are pushed over the latter for the purpose of fixing the individual parts. It is advantageous to join together the plate portions which have been cut to size and the sleeves to already form a packing in the partially hardened state or in the hardened, yet not carbonized state, with the use of punctiform bonds by means of a suitable synthetic resin. After the carbonization of the packings, these points of contact result in additional anchoring of the individual parts over coke bridges. Ordered packings of very large dimensions or ordered packings which do not have a round form are held together by means of planar clamping anchors which are produced from textile fabric prepregs, by means of bandages or with rod-shaped anchors of CFC or graphite.

Other features which are considered as characteristic for the invention are set forth in the appended claims.

Although the invention is illustrated and described herein as embodied in a corrosion and heat-resistant ordered packing for mass transfer and heat exchange processes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings and examples.

Before discussing the drawings and the examples in detail, it is noted that the packing bodies required for the experiments described below were produced in the following manner:

A graphitized staple fiber textile fabric based on PAN fibers with the following textile properties: fiber density 1.70 g/cm$^3$, yarn titre 140 tex, textile binding twill fabric 2/2, tensile strength of the textile fabric according to DIN 53857 500 N, weight per unit area 235 g/m$^2$, was impregnated with 50% of a phenolic resin, relative to the weight of the textile fabric. The impregnated textile fabric was brought into the desired shape in a stamping press with a pressing power initially of 0.5 MPa and finally 2 MPa and subsequently hardened in the same press within 15 minutes and with a temperature increase from room temperature to 150° C. For purposes of facilitating removal from the mold, 0.025 mm thin plastics foils were laid between the textile fabric and the parts of the press mold. The press mold was formed of a planar female mold plate and a planar male mold plate into which triangular milled-out areas at an angle of 60° relative to the longitudinal axis were milled with a depth of 2 mm and a spacing of the base tips of 3 mm. The hardened CFK textile fabric profiles removed from the mold were then carbonized in a furnace with exclusion of oxygen with a temperature gradient of 15° C./h to a temperature of 1000° C.

Holding rings, which surrounded the packing along the generated surface and held it together, were produced in a similar manner from a carbon textile fabric woven from continuous fiber bundles. The textile fabric is characterized by the following data: fiber density 1.75 to 1.80 g/cm$^3$, yarn titre 200 tex, textile binding twill fabric 2/2, tensile strength of the textile fabric according to DIN 53857 3500 N, weight per unit area 240 g/cm$^3$. The textile fabric prepreg likewise impregnated with 50% by weight phenolic resin was cut into strips with a width of 25 mm and a length of 160 mm. In addition there was an incision into the strips by approximately 5 to 8 mm at a distance of approximately 10 mm from their wide side so that lamellae developed which could later be bent outwards. The strips thus cut to size were then wound over a fireproof core which is cylindrical in the lower portion and opens conically outwards in the upper portion. In the cylindrical portion the core corresponded to the packing diameter and in the upper portion at the cone end corresponded to the inside diameter of the column that was later to receive the packing. When winding the textile woven fabric strip onto the core, the lamellae which developed as a result of the incision were bent outwards as a result of the upper conical extension of the core and fixed in their position. Subsequently, as described above, hardening, carbonization and then removal from the mold were effected.

Small plates or lamellae were then cut from the carbonized textile fabric profiles in accordance with the dimensions of the ordered packing (diameter 50 mm, height 54 mm) in such a way that the zigzag-shaped profiles extended at an angle of 60° relative to their lower edge. The parts which were cut to size were then put together to give the shape of the packing in such a way that in each case, the profiles lay together while intersecting one another so that a plurality of channels developed, extending obliquely from the top to the bottom or vice versa crosswise. Two or three holding rings were pushed over the parts, which had been put together, and were arrested with graphite pins.

Figure 1:
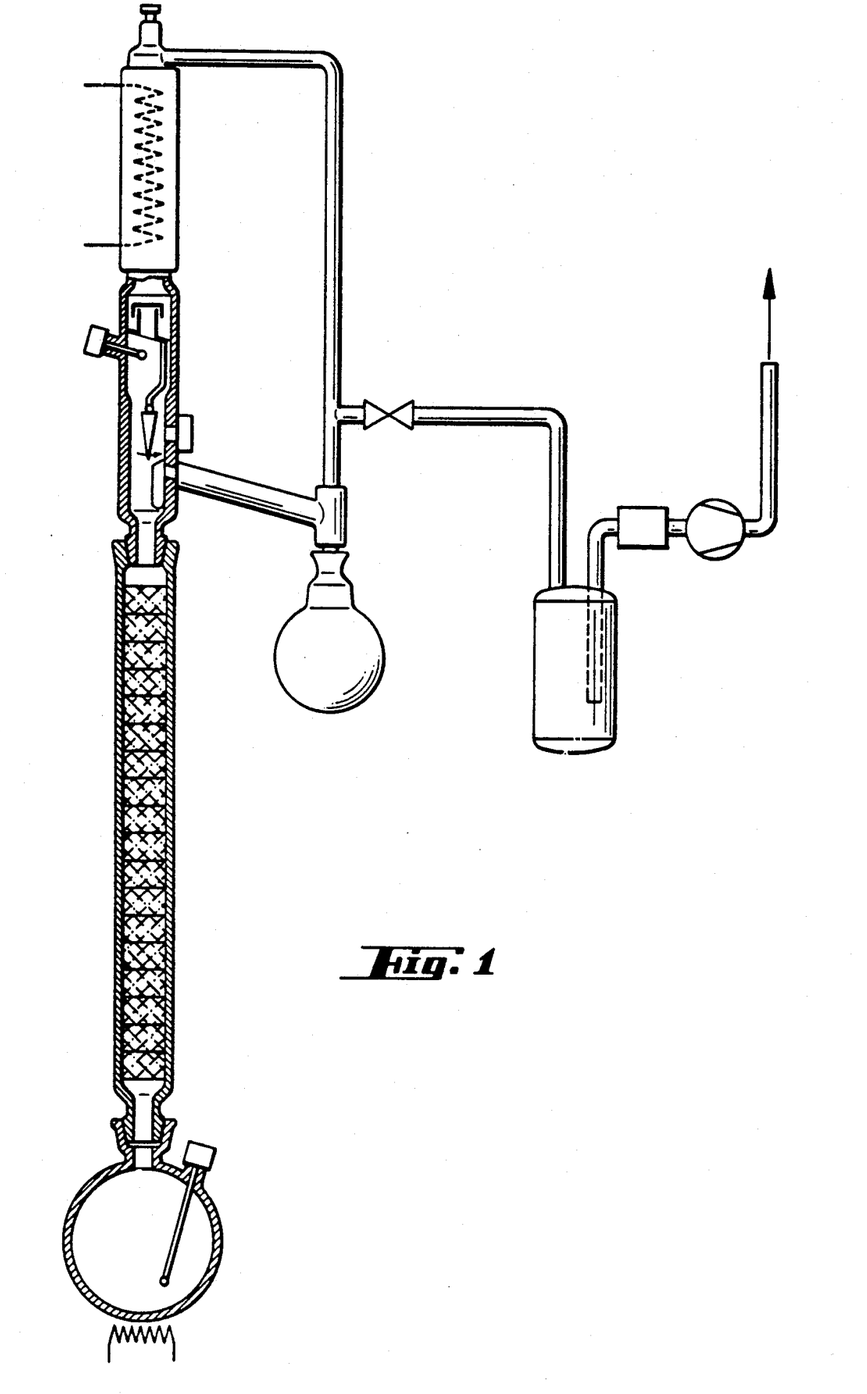
FIG. 1 is a diagrammatic, partly sectional, elevational view of a rectifying column used to carry out experiments concerning the invention.

Referring now to the figures of the drawing in detail and first, particularly, to FIG. 1 thereof, there are seen eighteen such ordered packings of CFC installed into a rectifying column, which is diagrammatically represented in this case and which has a mode of operation that is known to every one of skill in the art. The following experiments were carried out with this configuration:

EXPEREMENT 1

Figure 2:
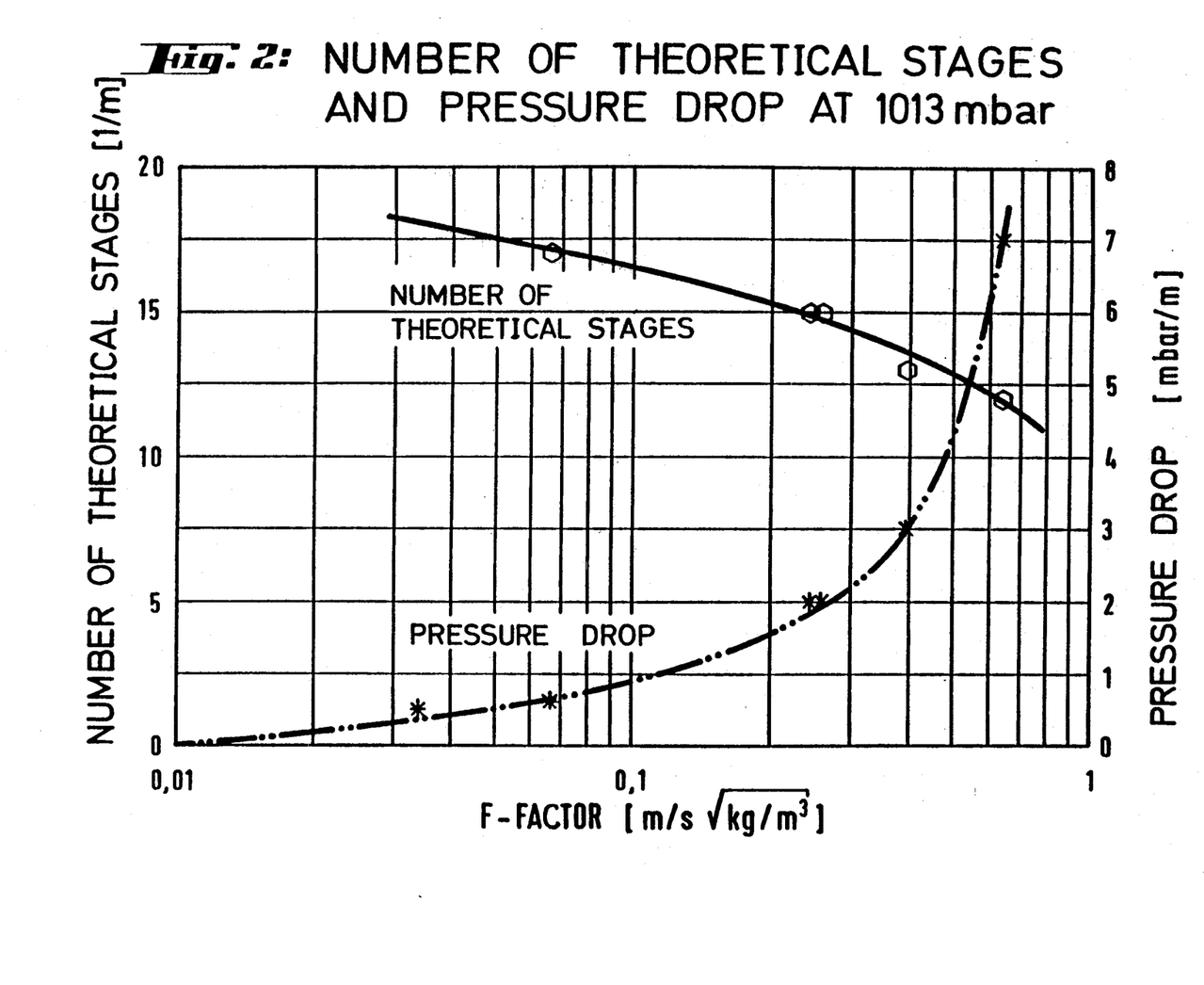
FIGS. 2-5 are graphs showing results of experiments performed with regard to the invention.

A separator stage number per meter was determined at a pressure of 1013 mbar with a test mixture of 625 g chlorobenzene and 1375 g ethyl benzene. Depending on a vapor loading factor (liquid load factor), the separator stage numbers lay between 12 and 20. The results are shown in detail in FIG. 2.

EXPERIMENT 2

Figure 3:
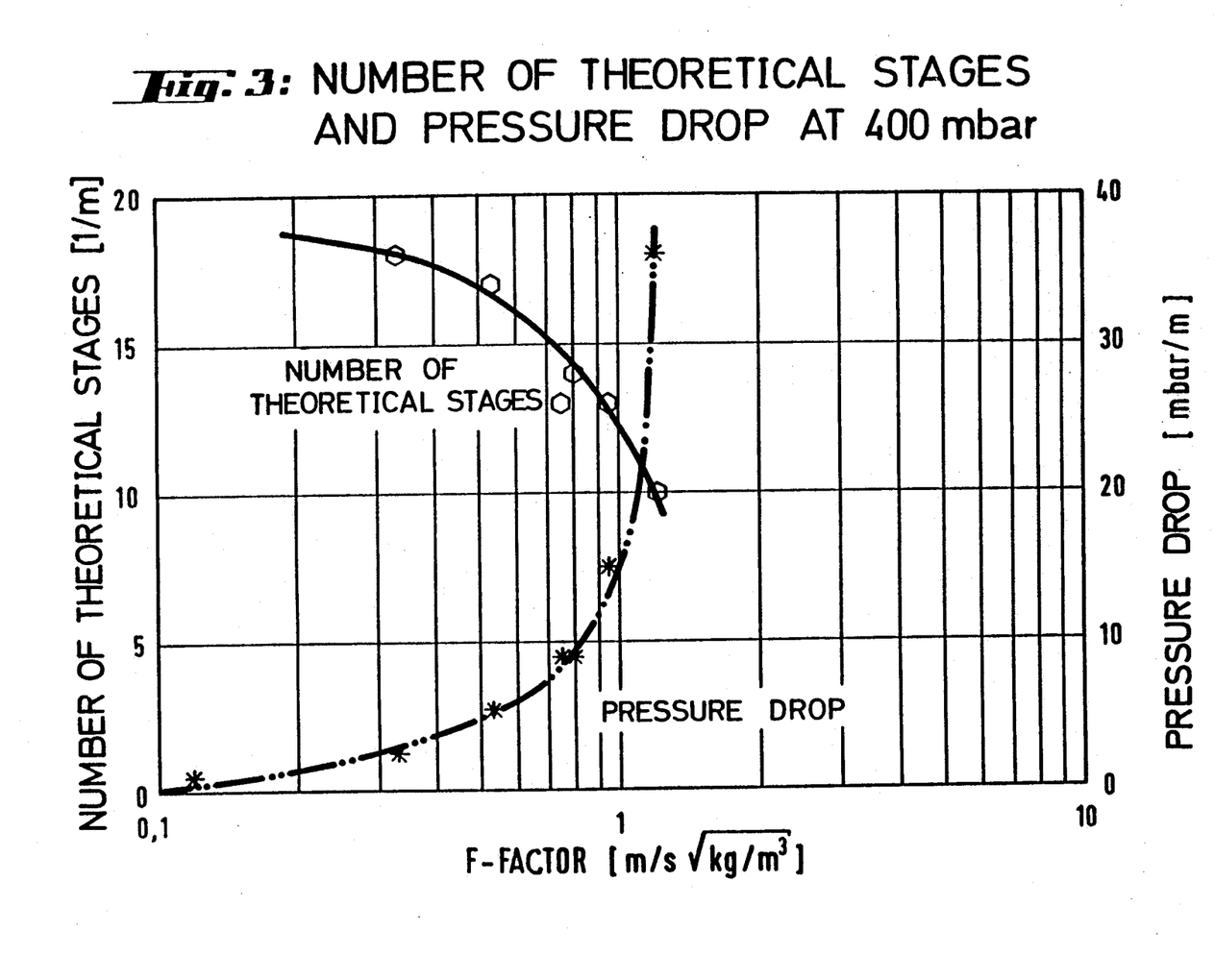

With the same experimental configuration, the separator stage number per meter was tested under vacuum rectification conditions of 400 mbar. The separator stage numbers lay between 13 and 18 depending on the vapor loading. The results are shown in FIG. 3.

EXPERIMENT 3

Figure 4:
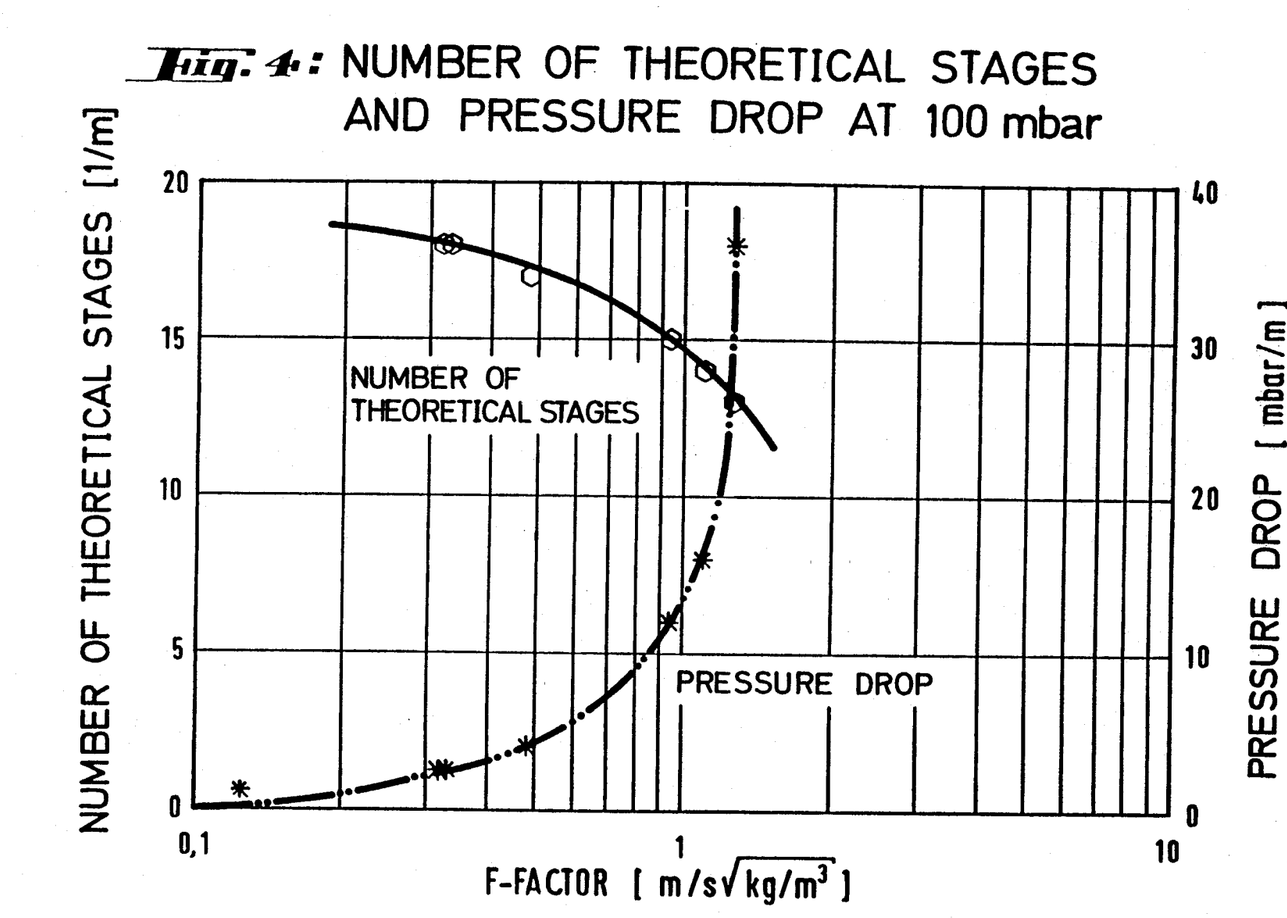
Figure 5:
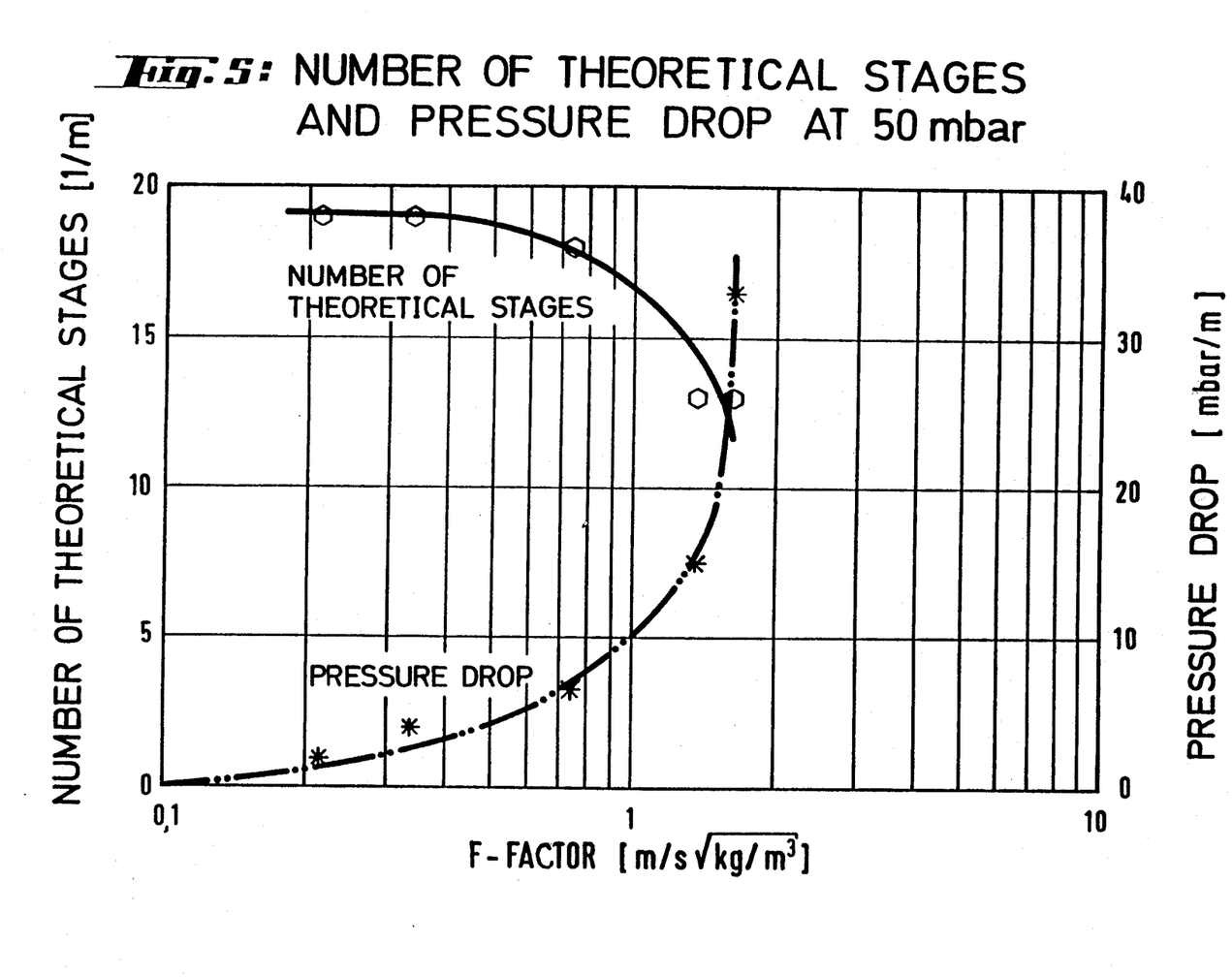

With retention of the experimental configuration of Experiment 1 and under vacuum rectification conditions of 100 mbar, the separator stage numbers lay between 14 and 18 depending on the vapor loading, as shown in FIG. 4, while in Experiment 4 separator stage numbers of 14 to 20 were measured in the vacuum rectification range of 50 mbar depending on the vapor loading, as shown in FIG. 5.

The experiments show that with the ordered packings of CFC according to the invention it is possible to achieve separating capacities which are as good as with known ordered packings. Thus, for example, rectificative upgrading of mixtures of substances which are difficult to separate, such as, for example, chlorotoluene/nitrochlorotoluene or mixtures of isomers, can be carried out successfully. However, the actual advantageous properties of the packings according to the invention, which give rise to the technical advance, are:

excellent corrosion-resistance to all media with the exception of strong oxidants;

erosion-resistance when used in the carbonized, non-graphitized state;

low weight. The packings are formed of 100% carbon. The high-strength material CFC, which is resistant to bending and is sufficiently elastic in thin layers, in addition permits filigree, material-saving methods of construction;

porosity being adjustable within wide limits;

possibility of producing any technically advantageous form;

possibility of introducing through-openings and holes without stock-removing mechanical processing;

heat-resistance and stability of shape up to approximately 3000° C.;

very good thermal conductivity;

production costs like in the case of known packings of this type; and capability of being produced with high-purity quality. Packings of this type are suitable for processing fluids of high purity.

Due to the combination of these excellent properties, columns fitted with the packings according to the invention are suitable, for example, for mass transfer and heat exchange processes of aggressive substances such as hydrochloric acid, sulphuric acid, hydrofluoric acid and sodium hydroxide solution or for mixtures of substances which occur in washing columns for exhaust air purification. Various processes which were problematical due to the corroding effect of the participating media, can therefore be directed towards a real solution. With these packings, high spray densities can be achieved in the case of precipitation of corrosive gases which are difficult to dissolve. As a result of their low weight they are predestined for offshore applications. However, this property also opens up the possibility of installation constructions which are overall lighter and accordingly cost saving. Another area of application is opened up in the case of the treatment of high-purity fluids, for example, for the electronics sector or analysis work. A passing over of impurities from the corrosion-resistant and erosion-resistant and also high-purity packings, is thereby excluded.

We claim:

1. An ordered packing assembly for columns or reactors for mass transfer and heat exchange processes, comprising an ordered packing built up from pre-formed individual parts, said pre-formed individual parts being built up from thin plates of matrix carbon formed from a matrix precursor and being reinforced with a filler of carbon fibers being present in carbonized form prior to contacting with said matrix precursor, said plates having perforations formed therein with a clear width of substantially from 10 to 5,000 μm and having a profile and lower and upper surfaces;

said filler of carbon fiber-reinforced carbon being selected from the group consisting of continuous carbon fibers and carbon fiber yarns interlinked with textile bindings;

said filler being present in the form of planar structures disposed in said plates in single layers and parallel to said upper and lower surfaces of said plates said pre-formed individual parts being held together by elements selected from the group consisting of carbon and carbon fiber reinforced carbon.

2. The ordered packing according to claim 1, wherein said carbon fibers and carbon fiber yarns are linked with each other in a two-dimensional manner by said textile bindings.

3. The ordered packing according to claim 1, wherein said carbon fibers and carbon fiber yarns are linked with each other in a three-dimensional manner by said textile bindings.

4. The ordered packing according to claim 1, wherein said pre-formed individual parts are planar areal structures having profiles.

5. The ordered packing according to claim 1, wherein said pre-formed individual parts are bowed areal structures having profiles.

6. The ordered packing according to claim 1, wherein said filler is formed of continuous filaments.

7. The ordered packing according to claim 1, wherein said filler is formed of yarns produced from continuous filaments.

8. The ordered packing according to claim 1, wherein said filler is formed of yarns produced from staple fibers.

9. The ordered packing according to claim 1, wherein said filler has a twill fabric binding.

10. An ordered packing assembly for columns or reactors for mass transfer and heat exchange processes, comprising an ordered packing built up from pre-formed individual parts.

said pre-formed individual parts being built up from thin plates of matrix carbon formed from a matrix precursor and being reinforced with a filler of carbon fibers formed from a fibrous precursor and having been made infusible by thermal processing prior to contacting with said matrix precursor, said plates having perforations fromed therein with a clear width of substantially from 10 to 5,000 μm and having a profile and lower and upper surfaces;

said filler of carbon fiber-reinforced carbon being selected from the group consisting of continuous carbon fibers and carbon fiber yarns interlinked with textile bindings;

said filler being present in the form of planar structures disposed in said plates in single layers and parallel to said upper and lower surfaces of said plates.

said pre-formed individual parts being held together by elements selected from the group consisting of carbon and carbon fiber reinforced carbon.

11. The ordered packing according to claim 10, wherein said carbon fibers and carbon fiber yarns are linked with each other in a two-dimensional manner by said textile bindings.

12. The ordered packing according to claim 10, wherein said carbon fibers and carbon fiber yarns are linked with each other in a three-dimensional manner by said textile bindings.

13. The ordered packing according to claim 10, wherein said pre-formed individual parts are planar areal structures having profiles.

14. The ordered packing according to claim 10, wherein said pre-formed individual parts are bowed areal structures having profiles.

15. The ordered packing according to claim 10, wherein said filler is formed of continuous filaments.

16. The ordered packing according to claim 10, wherein said filler is formed of yarns produced from continuous filaments.

17. The ordered packing according to claim 10, wherein said filler is formed of yarns produced from staple fibers.

18. The ordered packing according to claim 10, wherein said filler has a twill fabric binding.

* * * * *